United States Patent
Kubonoya et al.

(10) Patent No.: US 7,861,688 B2
(45) Date of Patent: Jan. 4, 2011

(54) CONTROL APPARATUS AND METHOD OF AN INTERNAL COMBUSTION ENGINE

(75) Inventors: Hideki Kubonoya, Toyota (JP); Masaharu Tanaka, Toyota (JP); Toshiya Oishi, Toyota (JP); Masami Kondo, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1015 days.

(21) Appl. No.: 11/657,598

(22) Filed: Jan. 25, 2007

(65) Prior Publication Data
US 2010/0269784 A1 Oct. 28, 2010

(30) Foreign Application Priority Data
Jan. 30, 2006 (JP) .............................. 2006-021020

(51) Int. Cl.
*F02D 41/04* (2006.01)
*G06F 19/00* (2006.01)

(52) U.S. Cl. .................................. 123/339.12; 701/110

(58) Field of Classification Search ............. 123/339.1, 123/339.12, 339.15, 339.19, 339.23, 350, 123/361, 399, 402, 403; 701/110, 101–103, 701/111, 114; 73/114.13, 114.15
See application file for complete search history.

(56) References Cited

U.S. PATENT DOCUMENTS

| | | | | |
|---|---|---|---|---|
| 5,385,029 A * | 1/1995 | Yamanaka et al. | ............. | 62/133 |
| 6,497,212 B2 * | 12/2002 | Matsumoto et al. | ......... | 123/295 |
| 6,655,353 B1 * | 12/2003 | Rayl | .......................... | 123/436 |
| 6,704,639 B2 * | 3/2004 | Amano | ....................... | 701/102 |
| 6,742,498 B2 * | 6/2004 | Mabuchi et al. | ........ | 123/339.16 |
| 7,054,738 B1 * | 5/2006 | Stotsky | ....................... | 701/115 |
| 7,204,229 B2 * | 4/2007 | Ortiz | ..................... | 123/339.14 |
| 7,306,542 B2 * | 12/2007 | Bauerle et al. | ............. | 477/118 |
| 7,571,711 B2 * | 8/2009 | Sato et al. | .................. | 123/350 |
| 2003/0209224 A1 * | 11/2003 | Lee | ........................ | 123/339.11 |

FOREIGN PATENT DOCUMENTS

JP 2004-176671 A 6/2004

* cited by examiner

*Primary Examiner*—Willis R. Wolfe, Jr.
*Assistant Examiner*—Johnny H Hoang
(74) *Attorney, Agent, or Firm*—Sughrue Mion, PLLC

(57) ABSTRACT

A control apparatus of an internal combustion engine includes an idle torque calculating portion, a target torque setting portion, and a target throttle opening amount calculating portion. The idle torque calculating portion and the target throttle opening amount calculating portion calculate the idle torque and the target throttle opening amount when the internal combustion engine is in a non-idling state, respectively, using a common physical quantity relating to an operating state of the internal combustion engine.

10 Claims, 2 Drawing Sheets

CONTROL APPARATUS AND METHOD OF AN INTERNAL COMBUSTION ENGINE

INCORPORATION BY REFERENCE

The disclosure of Japanese Patent Application No. 2006-021020 filed on Jan. 30, 2006, including the specification, drawings and abstract is incorporated herein by reference in its entirety.

BACKGROUND OF THE INVENTION

1. Field of the Invention

The invention relates to a control apparatus and method of an internal combustion engine, and more particularly to a control apparatus and method of an internal combustion engine which avoids generating a torque step when switching the internal combustion engine to an idle off state (i.e., when the torque is operating in a state other than idling state) from an idle on state (i.e., when the engine is operating in a idling state) when executing control to control driving force.

2. Description of the Related Art

There is an idea that in a vehicle provided with an automatic transmission and an engine capable of controlling engine output torque independently of an accelerator pedal operation by a driver, positive and negative target driving torque that is calculated based on, for example, the operating conditions of the vehicle and the operation amount of an accelerator by the driver is realized by engine torque and the gear speed gear ratio of the automatic transmission (i.e., driving force control). Also, a control method referred to as "required driving force method" or "driving force demand method" is related to this.

For example, when the engine is in an idle on state, control is executed with engine torque in the ISC (Idle Speed Control) control range as the reference. When the engine is in the idle off state, engine torque that relies on the accelerator pedal operation amount is added to this such that the driving force required by the driver is realized.

Japanese Patent Application Publication No. JP-A-2004-176671 describes a control apparatus of an internal combustion engine, which smoothly shifts from operating in an idling state to a state other than the idling state while reliably preventing a step in the torque and a drop in engine speed. This control apparatus of an internal combustion engine is one which performs torque control based on a set target torque, and includes operating state detecting means for detecting an operating state including the speed of the internal combustion engine; target speed setting means for setting a target speed when the internal combustion engine is idling; feedback controlling means for feedback controlling a control value for setting the target torque when the internal combustion engine is idling so that the detected speed becomes equal to the set target speed; learning value calculating means for calculating a learning value of required torque while idling based on the control value that was feedback controlled; required torque calculating means for calculating, according to the detected operating state, the required torque while operating in a state other than the idling state; required torque correcting means for correcting the calculated required torque by adding the learning value; and target torque setting means for setting a target torque when operating in a state other than the idling state based on the corrected required torque.

According to this control apparatus of an internal combustion engine, when idling, the control value for setting the target torque is feedback controlled so that the speed of the internal combustion engine becomes equal to the target speed, and the learning value of the required torque when idling is calculated based on the control value that was feedback controlled. Therefore, the learning value calculated in such a manner indicates the net required torque when idling that is necessary to maintain the speed of the internal combustion engine at the target speed, i.e., that is necessary to maintain idle speed. Also, when the internal combustion engine is operating in a state other than the idling state, the required torque is calculated according to the operating state at that time, the calculated required torque is corrected by adding the learning value, and the target torque when operating in a state other than the idling state is set based on the corrected required torque. As described above, the required torque when operating in a state other than the idling state is set as the sum of the required torque that was calculated according to the operating state and the learning value indicative of the net required torque necessary to maintain idle speed. Therefore, by starting to operate the internal combustion engine in a state other than the idling state with the net required torque when idling as the base, continuity of the required torque can be ensured, which makes it possible to reliably prevent a torque step and a drop in engine speed so that a shift from operating in an idling state to operating in a state other than the idling state can be performed smoothly.

In an internal combustion engine provided with an ignition device, control is performed to advance or retard the ignition timing in order to change the output torque according to various conditions. Also, it is generally known that when the ignition timing differs, so too does the ignition efficiency such that when the internal combustion engine is in an idling state (i.e., idle on state), the relative ignition efficiency drops compared with when the internal combustion engine is in a non-idling state (i.e., idle off state). The target torque is set by adding the required torque for the idle off state to the required torque for the idle on state that takes the ignition efficiency into account in this way.

Because the ignition efficiency in the idle on state differs from the ignition efficiency in the idle off state, the command values to the actuators in the internal combustion engine that have been converted from the target torque may be excessively large or excessively small such that a torque step may occur when switching from the idle on state to the idle off state.

However, Japanese Patent Application Publication No. JP-A-2004-176671 makes no mention of this kind of difference in ignition efficiency when the engine is in an idle on state versus when it is in an idle off state.

SUMMARY OF THE INVENTION

A first aspect of the invention thus relates to a control apparatus of an internal combustion engine, which includes an idle torque calculating portion that calculates an idle torque of the internal combustion engine based on a target throttle opening amount when the internal combustion engine is in an idling state; a target torque setting portion that sets a target torque of the internal combustion engine based on the idle torque and a required torque; and a target throttle opening amount calculating portion that calculates a target throttle opening amount when the internal combustion engine is in a non-idling state, based on the target torque. The idle torque calculating portion and the target throttle opening amount calculating portion calculate the idle torque and the target throttle opening amount when the internal combustion engine is in a non-idling state, respectively, using a common physical quantity that relates to an operating state of the internal combustion engine.

According to this first aspect, when the conversion from the target throttle opening amount to the idle torque of the internal combustion engine and the conversion from the target torque to the target throttle opening amount when the internal combustion engine is in a non-idling state are reversible, the idle torque and the target throttle opening amount when the internal combustion engine is in a non-idling state are calculated using a common physical quantity that relates to the operating state of the internal combustion engine. By sharing this physical quantity (such as the ignition efficiency and speed of the internal combustion engine which are parameters in the conversions) that relates to the operating state of the internal combustion engine in this way, the throttle opening amount when the internal combustion engine is in an idling state and the throttle opening amount when the internal combustion engine is in a non-idling state can be changed continuously, i.e., smoothly. If the throttle opening amount changes continuously, the output torque of the internal combustion engine also changes continuously so no torque step occurs. As a result, a control apparatus of an internal combustion engine can be provided which avoids a torque step at the boundary between the idle on (i.e., idling) state and a state in which the accelerator pedal has been depressed (i.e., in a driving force control region).

A second aspect of the invention relates to a control method of an internal combustion engine, which includes calculating an idle torque of the internal combustion engine based on a target throttle opening amount when the internal combustion engine is in an idling state; setting a target torque of the internal combustion engine based on the idle torque and a required torque; and calculating a target throttle opening amount when the internal combustion engine is in a non-idling state, based on the target torque. The idle torque and the target throttle opening amount when the internal combustion engine is in a non-idling state are calculated using a common physical quantity that relates to an operating state of the internal combustion engine.

BRIEF DESCRIPTION OF THE DRAWINGS

The foregoing and/or further objects, features and advantages of the invention will become apparent from the following description of example embodiments with reference to the accompanying drawings, in which the same or corresponding portions are denoted by the same reference numerals and wherein:

FIG. 3A shows the change over time in the accelerator pedal operation amount (ACPA), FIG. 3B shows the change over time in the throttle opening amount (TA), and FIG. 3C shows the change over time in the ignition timing.

DETAILED DESCRIPTION OF THE PREFERRED EMBODIMENTS

Figure 1:
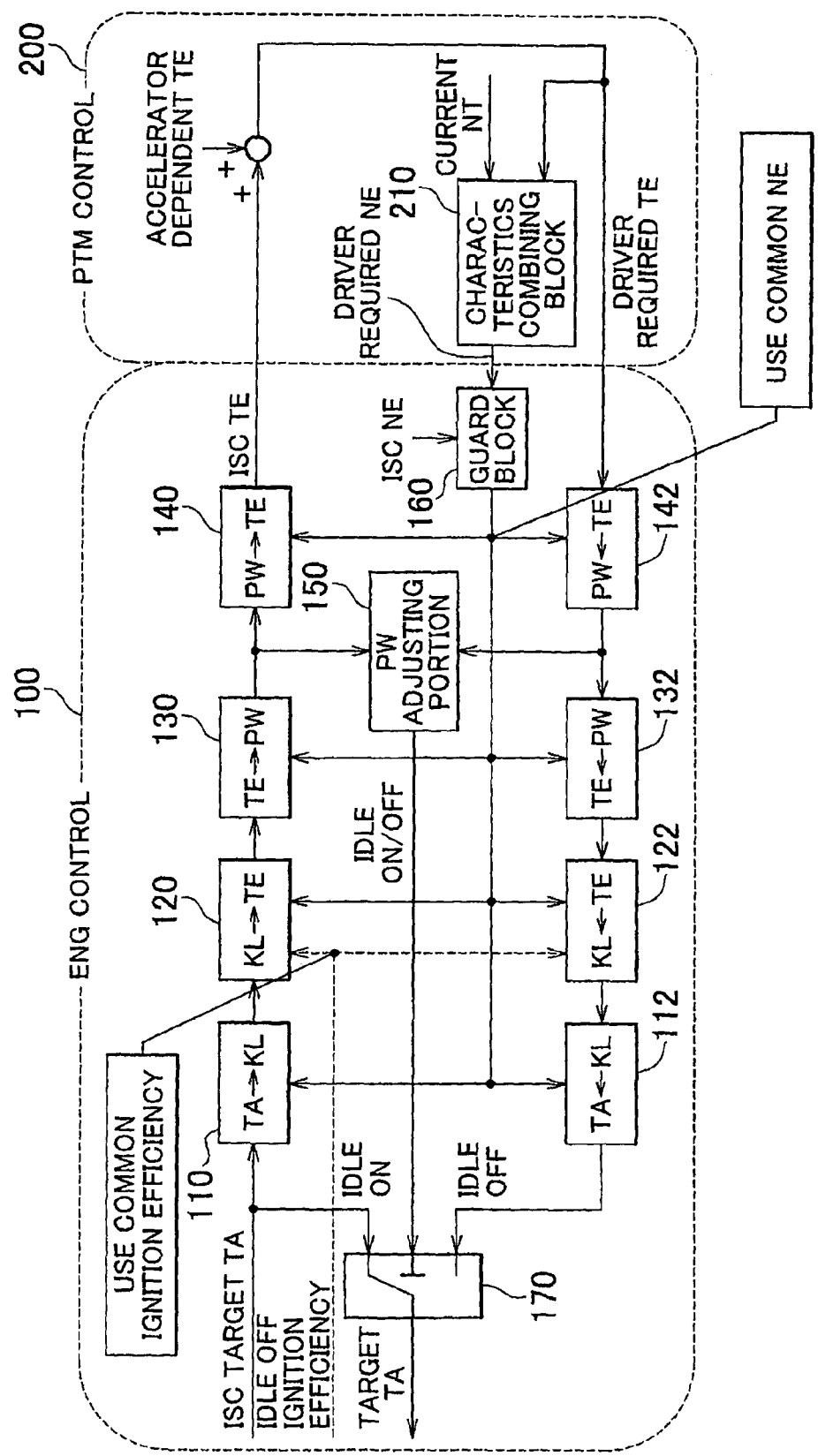
FIG. 1 is a control block diagram of a control apparatus of an internal combustion engine according to an example embodiment of the invention.

Hereinafter, example embodiments of the invention will be described in detail with reference to the accompanying drawings. In the following description, like parts with be denoted by like reference numerals. Like parts will also be referred to by same nomenclature and will have the same function. Therefore, detailed descriptions of those parts will not be repeated. In the following description, NE denotes engine speed, TE denotes engine torque, TA denotes throttle opening amount, KL denotes load factor, and PW denotes driving force.

An engine control system which serves as the control apparatus of an internal combustion engine according to this example embodiment of the invention will be described with reference to FIG. 1. This engine control system includes an engine control portion 100, and a PTM (Power Train Manager) control portion 200 that outputs a driver required engine torque (target TE) and a driver required engine speed (target NE) to the engine control portion 100. The PTM control portion 200 calculates the driver required engine torque (target TE) by adding torque dependent on the accelerator pedal operation amount to the engine torque of an ISC (Idle Speed Control) control region which is used as the reference.

This example embodiment is largely characteristic in that a calculating portion that calculates the engine torque in the ISC control region and a calculating portion that calculates the target throttle opening amount in the driving force control region use a common engine speed NE and ignition efficiency. As a result, a change in the throttle opening amount can be made continuous at the boundary between when the engine is determined to be in the idle on state (ISC control region) and when the accelerator pedal has been depressed (the driving force control region according to the driver when the engine is in the idle off state), thereby avoiding a torque step.

Here, the ignition efficiency will be described. Ignition efficiency is a parameter for correcting the difference between the base ignition efficiency at the base ignition timing and the ignition efficiency at the current ignition timing. The ignition efficiency changes depending on the ignition timing (i.e., the retard amount). In engine torque control, a KL↔TE conversion is performed using and the relationship between the engine speed NE, the engine torque TE, the load factor KL at the base ignition timing (i.e., base ignition efficiency).

The engine torque TE of the base ignition timing is calculated according to the following expressions (1) to (3).

$$\text{Engine torque } TE \text{ at base ignition efficiency} = \text{map}(NE, KL) \quad (1)$$

$$\text{Load factor } KL = \text{map}(NE, \text{Engine torque } TE \text{ at base ignition efficiency}) \quad (2)$$

$$\text{Engine torque } TE \text{ at base ignition timing} = \text{Engine torque } TE \text{ at current ignition timing} \times \text{Base ignition efficiency/Current ignition efficiency} \quad (3)$$

As shown in FIG. 1, the engine control portion 100 includes a conversion block 110 and a corresponding inverse transformation block 112, a conversion block 120 and a corresponding inverse transformation block 122, a conversion block 130 and a corresponding inverse transformation block 132, a conversion block 140 and a corresponding inverse transformation block 142, a PW adjusting portion 150, a lower limit guard block 160, and a selector 170.

The conversion block 110 converts the target throttle opening amount in ISC control (i.e., ISC target TA) to a target load factor in ISC control (i.e., ICS target KL). The inverse transformation block 112 converts the target load factor required by the driver (i.e., driver required KL) to a target throttle opening amount (driver required TA). These conversions and inverse transformations are executed using an air model (based on the engine speed) and are invertible transformations.

The conversion block 120 converts the target load factor in ISC control (i.e., ISC target KL) to a target engine torque in ISC control (i.e., ISC target TE). The inverse transformation block 122 converts the target engine torque required by the driver (i.e., driver required TE) to a target load factor required by the driver (i.e., driver required KL). These conversions and inverse transformations are executed using the engine speed and the ignition efficiency and are invertible transformations.

The conversion block 130 converts the target engine torque in ISC control (i.e., ISC target TE) to a target driving force in ISC control (i.e., ISC target PW). The inverse transformation block 132 converts the target driving force required by the driver (i.e., driver required PW) to a target engine torque required by the driver (i.e., driver required TE). These conversions and inverse transformations are executed using the engine speed and are invertible transformations.

The conversion block 140 converts the target driving force in ISC (i.e., ISC target PW) to a target engine torque in ISC control (ISC target TE).

The inverse transformation block 142 converts the target engine torque required by the driver (i.e., driver required TE) to a target driving force required by the driver (i.e., driver required PW). These conversions and inverse transformations are executed using the engine speed and are invertible transformations.

The PTM control portion 200 adds the accelerator dependent engine torque TE to the target engine torque in ISC control (i.e., ISC target TE) output from the conversion block 140. More specifically, the PTM control portion 200 adds the engine torque TE that is dependent on the accelerator pedal operation amount to the ISC target TE which is used as the starting point. This addition yields the driver required TE (i.e., the required TE when the engine is in the idle off state).

A characteristics combining block 210 calculates the engine speed NE at a static balance point that converges from the current NT (i.e., turbine speed in the torque converter) and the driver required torque TE to obtain the driver required NE (i.e., target NE). This driver required NE is an engine speed NE that satisfies expression (4) below. Here, C is the torque capacity (capacity coefficient) of the torque converter.

$$TE = \mathrm{map}(TA, NE) = C \times NE^2 \qquad (4)$$

The lower limit guard block 160 in the engine control portion 100 guards the driver required torque NE with a lower limit value using the ISC target NE and thus calculates the required NE used in engine control. In ISC control, the target TA for achieving the ISC target NE is calculated by feedback and realized.

The PW adjusting portion 150 adjusts the driving force level. When the ISC target PW is equal to or greater than the driver required PW, the engine is determined to be in the idle on state, and when the ISC target PW is less than the driver required PW, the engine is determined to be in the idle off state.

The selector 170 switches between the ISC target TA and the driver required TA depending on which state the engine is in (i.e., the idle on state or the idle off state).

The characteristic features in FIG. 1 are i) that a common engine speed NE is used in the conversion block 110 and the corresponding inverse transformation block 112, the conversion block 120 and the corresponding inverse transformation block 122, the conversion block 130 and the corresponding inverse transformation block 132, the conversion block 140 and the inverse transformation block 142, and ii) a common ignition efficiency is used in the conversion block 120 and the corresponding inverse transformation block 122.

Figure 2:
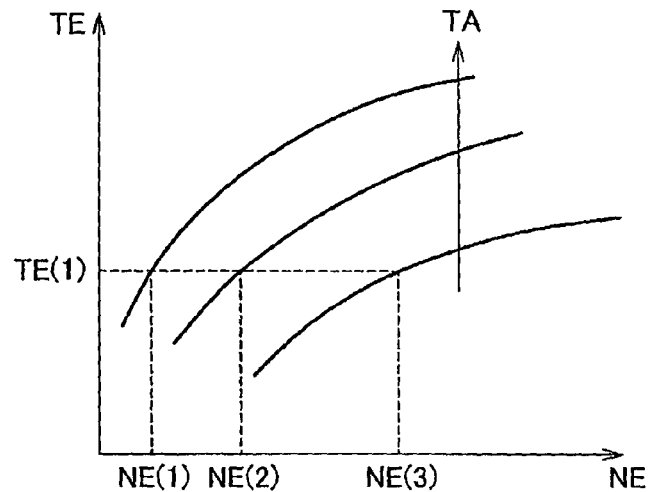
FIG. 2 is a graph showing the relationship between engine speed and engine torque.

FIG. 2 shows characteristic curved lines of a typical engine which indicate the engine characteristics with the horizontal axis of the graph representing the engine speed NE and the vertical axis of the graph representing the engine torque TE. The throttle opening amount TA used as the parameter.

Even at the same engine speed NE, the torque TE generated by the engine increases as the throttle opening amount TA increases. Therefore, the engine speed NE that generates the same engine torque cannot be underspecified. For example, as shown in FIG. 2, when viewing three points of the parameter of the throttle opening amount TA, there are three engine speeds NE, i.e., NE (1), NE (2), and NE (3), with respect to the engine torque, i.e., TE (1).

In this way, the engine torque TE and the like is calculated using a common engine speed NE that is used in the conversion blocks and their corresponding inverse transformation blocks (i.e., the conversion block 110, the inverse transformation block 112, the conversion block 120, the inverse transformation block 122, the conversion block 130, the inverse transformation block 132, the conversion block 140, and the inverse transformation block 142) that use the engine speed NE.

Also, a common engine speed and a common ignition efficiency are used by the conversion block 120 and the corresponding inverse transformation block 122.

The relationship between the common ignition efficiency and engine speed NE, and the engine torque TE will now be described. The engine speed NE and the ignition efficiency are related as described above in the conversions of the engine torque TE at the current ignition timing ↔ the engine torque TE at the base ignition timing ↔ the load factor KL (i.e., in the conversion block 120, the inverse transformation block 122, the conversion block 130, the inverse transformation block 132, the conversion block 140, and the inverse transformation block 142).

The conversion of the load factor KL ↔ the throttle opening amount TA (i.e., in the conversion block 110, the inverse transformation block 112) uses an air model so the engine speed NE (and also the VVT (Variable Valve Timing) and ACIS (Acoustic Control Induction System) when they are provided) is related. When a common engine speed NE and a common ignition efficiency are used, the relationship of the engine torque TE at the current ignition timing ↔ the throttle opening amount TA becomes common. When the same engine torque TE is required, the same TA is realized. Similarly, when the same throttle opening amount is required, the same engine torque TE is realized.

Therefore, when the engine torque is changed continuously between the idle on and idle off states, the throttle opening amount TA can also be changed continuously. In this way, unless a common engine speed and a common ignition efficiency are used in the engine control portion 100, a torque step corresponding to the difference in the ignition timings of the idle on and idle off states will occur. This is because the idle on ignition timing (i.e., retard side) is less than the idle off ignition timing (i.e., advance side) so the idle on ignition efficiency is less than the idle off ignition efficiency. As a result, the engine torque TE generated when the state of the engine changes from idle on to idle off ends up changing.

Figure 3A:
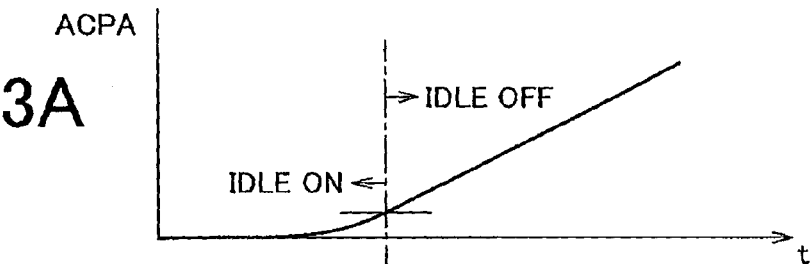
FIGS. 3A, 3B, and 3C are timing charts of a case when the state of the engine changes from idle on to idle off.

Avoiding a torque step when the state of the engine changes from idle on to idle off will now be described with reference to FIG. 3. FIG. 3A shows the change over time in the accelerator pedal operation amount (ACPA), FIG. 3B shows the change over time in the throttle opening amount (TA), and FIG. 3C shows the change over time in the ignition timing.

As shown in FIG. 3A, the accelerator pedal starts to be depressed slightly before time t(0) and the state of the engine changes from idle on to idle off at time t(0). As shown in FIG. 3C, the ignition timing differs depending on whether the engine is in the idle on state or the idle off state.

Figure 3B:
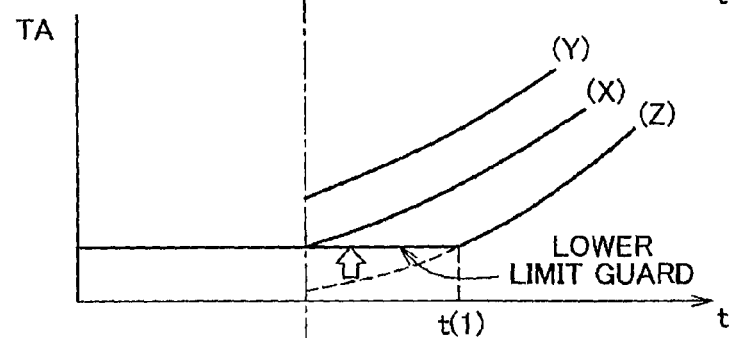
Figure 3C:
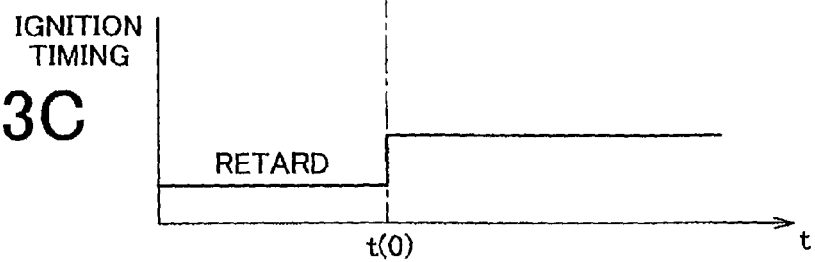

Therefore, in the cases of (Y) and (Z) in FIG. 3B where a common engine speed NE and a common ignition efficiency are not used in the conversion blocks and inverse transformation blocks, the following operations occur. First, as shown by (Y) in FIG. 3B, when the engine torque increases excessively, a torque step (i.e., an abrupt increase in torque) occurs. Also, as shown by (Z) in FIG. 3B, when the engine torque decreases excessively, a torque step (i.e., an abrupt decrease in torque) occurs. However, the lower limit guard block 160 prevents the engine torque from decreasing beyond the lower limit guard. Therefore, in reality, even if the engine is in the idle off state at time t(0), the torque increase will be delayed until time t(1).

On the other hand, with the engine control system according to this example embodiment, the throttle opening amount increases smoothly at time t(0), as shown by (X) in FIG. 3B, so a torque step does not occur.

As described above, in the engine control system according to this example embodiment, a common engine speed and a common ignition efficiency in the parameters are used in the conversions and inverse transformations between each physical quantity. Therefore, a torque step can be avoided even when the state of the engine changes from idle on to idle off.

As described above, the common physical quantity or quantities in the conversion blocks and inverse transformation blocks may be only the engine speed or both the engine speed and the ignition efficiency.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus of an internal combustion engine, comprising:
    an idle torque calculating portion that calculates an idle torque of the internal combustion engine based on a target throttle opening amount when the internal combustion engine is in an idling state;
    a target torque setting portion that sets a target torque of the internal combustion engine based on the idle torque and a required torque; and
    a target throttle opening amount calculating portion that calculates a target throttle opening amount when the internal combustion engine is in a non-idling state, based on the target torque,
    wherein the idle torque calculating portion and the target throttle opening amount calculating portion calculate the idle torque and the target throttle opening amount when the internal combustion engine is in a non-idling state, respectively, using a common physical quantity that relates to an operating state of the internal combustion engine.

2. The control apparatus of an internal combustion engine according to claim 1, wherein a fluid coupling is connected to an output shaft of the internal combustion engine, the control apparatus further comprising:
    a target speed calculating portion that calculates a target speed of the internal combustion engine based on the target torque and a characteristic of the fluid coupling.

3. The control apparatus of an internal combustion engine according to claim 2, wherein the physical quantity is the target speed.

4. The control apparatus of an internal combustion engine according to claim 2, further comprising:
    a lower limit guard block that guards a lower limit value of the target speed using a target speed when the internal combustion engine is in the idling state.

5. The control apparatus of an internal combustion engine according to claim 4, wherein the physical quantity is the target speed.

6. The control apparatus of an internal combustion engine according to claim 1, wherein the internal combustion engine is a spark ignition type internal combustion engine provided with an ignition device; and the physical quantity is an ignition efficiency corresponding to an ignition timing of the ignition device.

7. The control apparatus of an internal combustion engine according to claim 6, wherein the ignition efficiency is an ignition efficiency when the internal combustion engine is in the non-idling state.

8. The control apparatus of an internal combustion engine according to claim 6, wherein a fluid coupling is connected to an output shaft of the internal combustion engine, the control apparatus further comprising:
    a target speed calculating portion that calculates a target speed of the internal combustion engine based on the target torque and a characteristic of the fluid coupling,
    wherein the physical quantity is the ignition efficiency and the target speed.

9. A control apparatus of an internal combustion engine, comprising:
    idle torque calculating means for calculating an idle torque of the internal combustion engine based on a target throttle opening amount when the internal combustion engine is in an idling state;
    target torque setting means for setting a target torque of the internal combustion engine based on the idle torque and a required torque; and
    target throttle opening amount calculating means for calculating a target throttle opening amount when the internal combustion engine is in a non-idling state, based on the target torque,
    wherein the idle torque calculating means and the target throttle opening amount calculating means calculate the idle torque and the target throttle opening amount when the internal combustion engine is in a non-idling state, respectively, using a common physical quantity that relates to an operating state of the internal combustion engine.

10. A control method of an internal combustion engine, comprising:
    calculating an idle torque of the internal combustion engine based on a target throttle opening amount when the internal combustion engine is in an idling state;
    setting a target torque of the internal combustion engine based on the idle torque and a required torque; and
    calculating a target throttle opening amount when the internal combustion engine is in a non-idling state, based on the target torque,
    wherein the idle torque and the target throttle opening amount when the internal combustion engine is in a non-idling state are calculated using a common physical quantity that relates to an operating state of the internal combustion engine.

\* \* \* \* \*